United States Patent [19]

Kajiura et al.

[11] 4,259,468
[45] Mar. 31, 1981

[54] ETHYLENE-α-OLEFIN-POLYENE RUBBERY TERPOLYMER AND PROCESS FOR PRODUCTION THEREOF

[75] Inventors: Hirokazu Kajiura; Kazuhiko Murata, both of Ohtake; Hidekuni Oda, Iwakuni; Tatsuo Yasutake, Ohtake, all of Japan

[73] Assignee: Mitsui Petrochemical Industries Ltd., Tokyo, Japan

[21] Appl. No.: 64,516

[22] Filed: Aug. 7, 1979

[30] Foreign Application Priority Data

Aug. 17, 1978 [JP] Japan .................................. 53/99456
Aug. 17, 1978 [JP] Japan .................................. 53/99457

[51] Int. Cl.$^3$ ............................................ C08F 210/18
[52] U.S. Cl. ............................ 526/283; 260/33.6 PQ; 525/332; 525/333; 526/169; 526/282; 526/336
[58] Field of Search ............... 526/336, 282, 283, 169

[56] References Cited

U.S. PATENT DOCUMENTS

| | | | |
|---|---|---|---|
| 3,645,992 | 2/1972 | Elston | 260/80.78 |
| 3,674,755 | 7/1972 | Yamamoto et al. | 526/336 |
| 4,078,131 | 3/1978 | Zarauz | 526/336 |
| 4,125,699 | 11/1978 | Yamamoto et al. | 526/282 |

FOREIGN PATENT DOCUMENTS 856737 12/1960 United Kingdom .
1014874 12/1965 United Kingdom .
1030827 5/1966 United Kingdom .
1030989 5/1966 United Kingdom .
1294922 11/1972 United Kingdom .

OTHER PUBLICATIONS

Abstract Jap. Patent Pub. No. 40-14542 (11-70).
Abstract Japanese Laid-Open Patent Pub. No. 52-141887 (5-76).

Primary Examiner—Stanford M. Levin
Attorney, Agent, or Firm—Sherman & Shalloway

[57] ABSTRACT

A rubbery copolymer of ethylene, an α-olefin having 3 to 10 carbon atoms and a polyene, characterized by having (A) an ethylene/α-olefin mole ratio of from 50/50 to 95/5, (B) an iodine value of from 5 to 50, (C) an intrinsic viscosity $[\eta]$, measured in decaline at 135° C., of from 1.0 to 6.0 dl/g, (D) a weight average molecular weight/number average molecular weight ratio ($\overline{M}w/\overline{M}n$) of from 3 to 15, and (E) an iodine value index $\alpha_1$ for the lower molecular weight components and an iodine value index $\alpha_2$ for the higher molecular weight components, said $\alpha_1$ and $\alpha_2$ falling within the ranges $-30 \leq \alpha_1 \leq 0$ and $0 < \alpha_2 \leq 30$. Said copolymer can be obtained by copolymerizing ethylene, the α-olefin having 3 to 10 carbon atoms and polyene at a temperature of from about 40° C. to about 100° C. in the presence of a catalyst composed of (a) a vanadium compound of the formula VO(OR)$_n$X$_{3-n}$ in which R represents a hydrocarbon group, X represents a halogen atom, and n is a positive number within the range of $0 < n \leq 3$, and (b) an organoaluminum compound of the formula R'$_m$AlX'$_{3-m}$ in which R' represents a hydrocarbon group, X' represents a halogen atom, and m is a positive number within the range of $1 < m \leq 1.25$, the Al/V mole ratio being 2 to less than 5.

6 Claims, No Drawings

ETHYLENE-α-OLEFIN-POLYENE RUBBERY TERPOLYMER AND PROCESS FOR PRODUCTION THEREOF

This invention relates to rubbery copolymers of ethylene, α-olefins having 3 to 10 carbon atoms and polyenes and having specified characteristics and superior improved properties, and to a process for the production of the copolymers.

Specifically, this invention relates to ethylene-rich rubbery copolymers which are sulfur-curable and which exhibit excellent processabilities such as processability on rolls (roll processability) and extrudability, superior physical properties when vulcanized, such as excellent modulus and tensile strength, and an excellent balance of the processability and the physical properties, and which are suitable particularly for uses such as electrical insulations, foams, exterior automotive trims, and roofings. The invention also relates to a process for the production of said rubbery copolymers.

More specifically, this invention relates to a rubbery copolymer of ethylene, an α-olefin having 3 to 10 carbon atoms and a polyene, characterized by having (A) an ethylene/α-olefin mole ratio of from 50/50 to 95/5, (B) an iodine number of from 5 to 50, (C) an intrinsic viscosity [η], measured in decalin at 135° C., of from 1.0 to 6.0 dl/g, (D) a weight average molecular weight/number average molecular weight ratio ($\overline{M}w/\overline{M}n$) of from 3 to 15, and (E) an iodine number index $\alpha_1$ for the lower molecular weight components and an iodine number index $\alpha_2$ for the higher molecular weight components falling within the ranges: $-30 \leq \alpha_1 \leq 0$ and $0 < \alpha_2 \leq 30$, and a process for the production of said rubbery copolymer.

Many suggestions have been made in the past about the production of rubbers of the olefinic type copolymer which may contain polyenes, such as ethylene/propylene copolymer rubbers or ethylene/1-butene copolymer rubbers which may contain polyenes.

It has been difficult, however, to provide rubbers of the olefinic type copolymer which are sulfur-curable and which exhibit superior processability, excellent physical properties when made into vulcanized products, and an excellent balance of these two properties, as well as other satisfactory properties such as good moldability and good surface characteristics.

British Pat. No. 856,737 discloses a rubbery ethylene/1-butene copolymer which is obtained by using a catalyst composed of a titanium or vanadium compound, preferably titanium or vanadium tetrachloride and vanadium oxychloride, and an aluminum alkyl compound excluding aluminum monoalkyl dihalides, such as an aluminum trialkyl or aluminum dialkyl halide, particularly trihexyl aluminum or triisobutyl aluminum. However, the British patent is quite silent on the use of a polyene which is one essential ingredient of the rubbery copolymer of the present invention. The copolymer obtained by the British Patent is not sulfur-curable and has pure strength characteristics. This copolymer is difficult to pelletize because of too broad distributions of its composition and molecular weight, and the resulting pellets tend to be agglomerated. Furthermore, the vanadium component and the organoaluminum component of the catalyst used in the British patent do not come within the vanadium and organoaluminum components of the catalyst specified in the present invention.

U.S. Pat. No. 3,645,992 (corresponding to Japanese Patent Publication No. 21212/71) discloses a process for continuously producing a homogeneous random partially crystalline copolymer of ethylene and an α-olefin such as 1-butene, 1-hexene or 1-octene having a narrow molecular weight distribution using a catalyst which may overlap the catalyst used in the present invention. The U.S. patent, however, does not at all describe the use of polyenes. Hence, the resulting copolymer is not sulfur-curable. To obtain a copolymer having good uniformity by the U.S. patent, it is necessary to reduce the concentration of the catalyst, and to decrease to yield of the copolymer per unit volume of solvent.

British Pat. No. 1,014,874 (corresponding to Japanese Patent Publication No. 16148/65) discloses a process for producing a sulfur-curable copolymer rubber of ethylene, an α-olefin such as propylene or 1-butene and dicyclopentadiene and/or methylcyclopentadiene dimer using a catalyst comprising an alkyl aluminum halide and a vanadium compound selected from the group consisting of $VCl_4$ and $VOCl_3$. The vanadium compounds as an essential catalyst ingredient in this British Patent do not come within the vanadium compounds specified in the present invention. As will be shown later by a comparative working example, the objects of this invention cannot be achieved by the use of the vanadium compounds disclosed in the British patent.

Japanese Patent Publication No. 14542/74 discloses a process for producing an ethylene/α-olefin copolymer using a catalyst system prepared by bubbling an inert gas into the reaction mixture of an alcohol and vanadium oxytrichloride in an inert solvent, and mixing the product with an alkyl aluminum compound. This Japanese patent publication states that the aforesaid catalyst system should be used because a vanadium compound having an alkoxy group such as $VO(OR_3)$, $VO(OR)_2X$ and $VO(OR)X_2$ in which R represents an alkyl group and X represents a halogen atom is very expensive. The Japanese Patent Publication also teaches the use of trialkyl aluminums, dialkyl aluminum monohalides, monoalkyl aluminum dihalides and alkyl aluminum sesquihalides, preferably dialkyl aluminum monohalides and alkylaluminum sesquihalides, as the alkyl aluminum compounds. The Japanese patent publication exemplifies propylene and 1-butene as the α-olefin and indicates the use of a polyene as an optional comonomer component. The Japanese patent publication specifically discloses only a rubbery copolymer of ethylene, propylene and dicyclopentadiene, and gives a specific example only of the copolymer having an ethylene content of 48 to 53% by weight. This copolymer does not have satisfactory pelletizability, and even when it is forcibly pelletized, the resulting pellets will be rapidly agglomerated and lose the shape of pellet. Of course, such a copolymer cannot have the improved properties of the copolymer of this invention which are described hereinabove.

Japanese Patent Publication No. 2924/68 discloses a process for the production of a similar copolymer to the above-cited Japanese Patent Publication No. 14542/74 using a catalyst comprising the reaction mixture of an alcohol and vanadium oxytrichloride and a dialkylaluminum monohalide or alkylaluminum sesquihalide. This Japanese Patent Publication specifically shows only a rubbery ethylene/propylene copolymer, and the copolymers obtained in all of the specific working examples in this publication have an ethylene content of 32 to 58% by weight. Such copolymers do not show satisfactory pelletizability, nor the improved properties of the rubbery copolymers of this invention.

U.S. Pat. No. 3,674,755 (corresponding to Japanese Patent Publication No. 47591/72) discloses a method for preparing an olefinic hydrocarbon copolymer which comprises contacting ethylene and an α-olefin having 3 to 20 carbon atoms, with or without a polyene compound, with (A) a vanadium compound having the general formula $VO(OR)_m X_{3-m}$ in which R is a radical containing cycloaliphatic hydrocarbon having 5 to 20 carbon atoms, X is a halogen atom and m is an integer from 1 to 3, and (B) an organoaluminum compound having the general formula $AlR'_n X'_{3-n}$ in which R' is a hydrocarbon radical having 1 to 20 carbo atoms, X' is a halogen atom and n is an integer of from 1 to 3, the concentration of (A) in the reaction medium being from $10^{-4}$ millimole per liter to 50 millimole per liter, and the molar ratio of (B) to (A) being from 1:1 to 10,000:1.

All of the Examples in this U.S. patent discloses only an ethylene/propylene rubber with an ethylene content of from 49.3 to 78.5% by mole. Such a copolymer does not have satisfactory pelletizability, nor the improved properties of the rubber copolymer of this invention.

Japanese Patent Publication No. 196/73 (published Jan. 6, 1973; corresponding to British Pat. No. 1,294,922) discloses a copolymer of ethylene and at least one bicycloheptene and describes a component capable of overlapping the vanadium catalyst component specified in the present invention, but does not specifically disclose the organoaluminum catalyst component specified in the present invention. Since that copolymer has a high melting point and is too hard, it is not suited to applications involving rubber.

Japanese Laid-Open Patent Publication No. 141887/77 discloses a process for preparing an ethylene/propylene copolymer rubber or an ethylene/propylene/non-conjugated diene copolymer rubber having a high ethylene content and a wide molecular weight distribution. The proposal made in this Publication does not specifically disclose the organoaluminum catalyst component specified in the present invention, too. The copolymer disclosed in the publication has poor properties when made into vulcanizates, because its iodine number indices $\alpha_1$ and $\alpha_2$ fail to satisfy ranges specified in the present invention.

Japanese Patent Publication No. 25977/68 discloses a process for preparing a sulfur-curable multi-component copolymer from at least two α-olefins and diene or/and triene. The proposal made in this publication says that to obtain a copolymer rubber in the best yield, it is advisable to select an alkylaluminum sesquihalide of the formula $R_{1.5}AlX_{1.5}$ as an organoaluminum catalyst component and it is preferred to employ a polymerization temperature of $-5°$ to $10°$ C. The use of such a low temperature is disadvantageous commercially because of difficulty of the removal of heat of polymerization. If a polymerization temperature of about 40° C. or higher, preferably, about 50° C. or higher that is commercially advantageous is employed with the use of the catalyst suggested in the publication, there will be the trouble that the vulcanizate of the resulting copolymer rubber has poor tensile strength and poor permanent set.

With the foregoing conventional techniques on olefinic copolymer rubbers which may further contain polyenes, it has been difficult to provide a copolymer rubber having superior processability for molding, superior physical properties when vulcanized, and a good balance of both these properties. It has been well known that a wide molecular weight distribution is needed to attain good processability. According to the conventional techniques, however, if the molecular weight distribution of an ethylene/α-olefin/polyene copolymer rubber is widened in an attempt to improve its processability, the physical properties of its vulcanizate radically deteriorate. To improve the physical properties of the vulcanizate, on the other hand, it is necessary to narrow the molecular weight distribution of the copolymer rubber, thus making its processability poor. Thus, how to obtain an ethylene/α-olefin/polyene copolymer rubber having good processability and good physical properties when vulcanized, as well as a good balance of both these properties has been hitherto unknown.

The present inventors have made studies in an attempt to develop an improved technique capable of achieving both superior physical properties of vulcanizates of rubbery copolymers and superior processability of the rubber copolymers that the aforesaid prior arts have been unable to attain at the same time.

As a result, we have found that the selection of greatly restricted conditions for copolymerization enables the formation of a rubbery copolymer having a wide molecular weight distribution and an unusual distribution of polyene in the copolymer which is evidently different from that in the conventional copolymers. The present inventors have also found that the resulting rubbery copolymer has a good balance of its superior processability and superior physical properties when in the form of vulcanizate, said balance being unattainable by the prior arts.

According to the findings by the present inventors, the distribution of polyene in the rubbery copolymer is unusual and the polyene is present more in the higher molecular weight components, namely, that the polyene content of the higher molecular weight components is higher than that of the lower molecular weight components. In the conventional rubbery copolymer, the wider the molecular weight distribution, the lower the polyene content of the higher molecular weight components becomes, and the lowered polyene content of the higher molecular weight component is much lower than the average polyene content of the entire rubbery copolymer. Compared with the conventional rubbery copolymer, the rubbery copolymer of the present invention has a high polyene content in the higher molecular weight components. This structure of the rubbery copolymer of the present invention has so far been unknown and is unusual.

The studies by the present inventors have shown that such a novel rubbery copolymer can be prepared by copolymerizing ethylene, a $C_3$–$C_{10}$ α-olefin and a polyene at a commercially advantageous temperature of about 40° to about 100° C., preferably about 50° to about 80° C., in the presence of a catalyst composed of (a) a vanadium compound of the formula

wherein R represents a hydrocarbon group, X represents a halogen atom, and n is a positive number within the range of $0 < n \leq 3$, and (b) an organoaluminum compound of the formula

wherein R' represents a hydrocarbon group, X' represents a halogen atom, and m is a positive number within the range of $1<m\leq1.25$, preferably $1<m\leq1.2$, more preferably $1.05\leq m\leq1.2$, the Al/V mole ratio being 2 to less than 5.

An object of the present invention, therefore, is to provide a sulfur-curable rubbery copolymer of ethylene/$C_3$-$C_{10}$ α-olefin/polyene which is novel and which has improved properties.

Another object of the present invention is to provide a process capable of preparing said rubbery copolymer commercially advantageously.

These objects and many other objects and advantages of the present invention will become more apparent from the following description.

According to the present invention, there is provided a rubbery copolymer of ethylene, an α-olefin having 3 to 10 carbon atoms and a polyene, characterized by having (A) an ethylene/α-olefin mole ratio of from 50/50 to 95/5, (B) an iodine number of from 5 to 50, (C) an intrinsic viscosity [η], measured in decalin at 135° C., of from 1.0 to 6.0 dl/g, (D) a weight average molecular weight/number average molecular weight ratio ($\overline{M}w/\overline{M}n$) of from 3 to 15, and (E) an iodine number index $\alpha_1$ for the lower molecular weight components and an iodine number index $\alpha_2$ for the higher molecular weight components falling within the ranges $-30\leq\alpha_1\leq0$ and $0<\alpha_2\leq30$.

According to the present invention, there is also provided a process for preparing said rubbery copolymer, which comprises copolymerizing ethylene, the α-olefin having 3 to 10 carbon atoms and the polyene at a temperature of from about 40° C. to about 100° C. in the presence of a catalyst composed of (a) a vanadium compound of the formula

$$VO(OR)_nX_{3-n}$$

wherein R represents a hydrocarbon group, X represents a halogen atom, and n is a positive number within the range of $0<n\leq3$, and (b) an organoaluminum compound of the formula

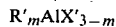

$$R'_mAlX'_{3-m}$$

wherein R' represents a hydrocarbon group, X' represents a halogen atom, and m is a positive number within the range of $1<m\leq1.25$, the Al/V mole ratio being 2 to less than 5.

The α-olefin having 3 to 10 carbon atoms that is a constituent of the rubbery copolymer of the present invention includes, for example, propylene, 1-butene, 1-pentene, 1-hexene, 4-methyl-1-pentene, 1-octene, and 1-decene. The particularly preferable α-olefin is propylene or 1-butene.

Typical examples of the polyene used to prepare the rubber copolymer of this invention include non-conjugated linear dienes such as 1,4-hexadiene, 1,6-octadiene, 2-methyl-1,5-hexadiene, 6-methyl-1,5-heptadiene, or 7-methyl-1,6-octadiene; non-conjugated cyclic dienes such as cyclohexadiene, dicyclopentadiene, methyltetrahydroindene, 5-vinyl-2-norbornene, 5-ethylidene-2-norbornene, 5-methylene-2-norbornene, 5-isopropylidene-2-norbornene, or 6-chloromethyl-5-isopropenyl-2-norbornene; and trienes such as 2,3-diisopropylidene-5-norbornene, 2-ethylidene-3-isopropylidene-5-norbornene, 2-propenyl-2,5-norbornadiene, 1,3,7-octatriene or 1,4,9-decatriene. Particularly interesting polyenes are dicyclopentadiene, and 5-ethylidene-2-norbornene.

The characteristic (A) required of the rubbery copolymer of the present invention is that the ethylene/$C_3$-$C_{10}$ α-olefin mole ratio and which is selected within the range of from 50/50 to 95/5 depending on the type of the α-olefin and other factors so that the copolymer formed has elastomeric properties. The rubbery copolymer having an ethylene/α-olefin mole ratio of less than 50 is not preferred, because it does not give vulcanized rubber having good physical properties. The preferred range of the ethylene/α-olefin mole ratio varies with the type of the α-olefin. When the α-olefin is propylene, for example, said ratio is usually from 50/50 to 90/10, preferably from 60/40 to 87/13. When the α-olefin is the one having 4 or more carbon atoms, said ratio is usually from 80/20 to 95/5, preferably from 85/15 to 95/5. The proportions of the ethylene and α-olefin in the resulting copolymer can be determined by infrared spectrum analysis of by $^{13}$C NMR spectrum analysis.

The characteristic (B) required of the rubbery copolymer of the present invention has to do with the content of the polyene component that constitutes the rubbery copolymer. When the copolymer has an iodine number within the specified range, the rate of vulcanization is high, and the resulting vulcanized rubber has good properties. When the iodine number of the copolymer is lower than the specified limit, the copolymer is not sulfur-curable, or the rate of its vulcanization becomes extremely small. If it exceeds the specified upper limit, a gellation is apt to occur during the copolymerization. Accordingly, the iodine number of the rubbery copolymer of this invention should be from 5 to 50, preferably from 5 to 40. This corresponds to the presence of about 2 to 30% by weight, preferably about 2 to 25% by weight, of the polyene component in the rubbery copolymer.

The characteristic (C) required of the rubbery copolymer of this invention affects the processability of the copolymer. Excellent processability is imparted when the copolymer has the specified intrinsic viscosity [η] (measured in decalin at 135° C.). If the intrinsic viscosity is too low, the processing of the copolymer on rolls becomes difficult. If it is too high, the calendering of copolymer is difficult, and an extrudate of the copolymer has a poor texture. Accordingly, the copolymer of this invention should have an [η] of from 1.0 to 6.0 dl/g, preferably from 1.2 to 4.0 dl/g.

The characteristic (D) (to be referred to as Q value) required of the rubbery copolymer of the present invention affects the processability and the strength characteristics of the rubbery copolymer. When the Q value is more than 15, the uncured rubbery copolymer and the vulcanized rubber both have poor strength, and the surface of the molded product tends to become sticky. Accordingly, the copolymer of this invention should have a Q value ($\overline{M}w/\overline{M}n$) of from 3 to 15, preferably from 4 to 12.

The Q value is determined in the following manner in accordance with the procedure described at pages 14 to 114 of "Gel Permeation Chromatography" by Takeuchi, published on May 20, 1976 by Maruzen Co., Ltd., Tokyo.

(1) Using standard polystyrene of a known molecular weight (mono-dispersed polystyrene, a product of Toyo Soda Mfg. Co., Ltd., Japan), the molecular weight M of the polystyrene sample and its GPC (gel permeation chromatography) count are measured. A calibration curve for the molecular weight M and the EV (elution volume) is drawn. The concentration of the polymer at this time is set at 0.02% by weight.

(2) A gel permeation chromatogram of the sample is taken by the GPC measuring method, and the number average molecular weight ($Mn = \Sigma MiNi/\Sigma Ni$) and the weight average molecular weight ($Mw = \Sigma Mi^2Ni/\Sigma MiNi$) are calculated for copolymer by (1) above, and the Q value (Mw/Mn) is determined.

The sample is prepared under the following conditions, and the conditions for GPC are as shown below.

PREPARATION OF THE SAMPLE (a) The sample is taken into an Erlenmeyer flask together with o-dichlorobenzene so as to provide a 0.04% solution.

(b) Into the Erlenmeyer flask containing the sample is added 0.1% by weight, based on the polymer solution, of 2,6-di-tert.-butyl-p-cresol as an antioxidant.

(c) The Erlenmeyer flask is heated to 140° C., and the contents are stirred for about 30 minutes to dissolve the polymer and the antioxidant.

(d) Then, at 135° to 140° C., the solution is filtered by a 1$\mu$ Millipore filter.

(e) The filtrate is subjected to gel permeation chromatography.

CONDITIONS FOR GEL PERMEATION CHROMATOGRAPHY (a) Device: Model 200, made by Waters Company
(b) Column: S-type (mix type) made by Toyo Soda Mfg. Co., Ltd.
(c) Amount of the sample: 2 ml
(d) Temperature: 135° C.
(e) Flow rate: 1 ml/min.
(f) Total theoretical stages of the column: $2 \times 10^4$ to $4 \times 10^4$ (measured with acetone)

The characteristic (E) required of the rubbery copolymer of the present invention affects a good balance of the superior processability of the copolymer and the superior physical properties of a vulcanizate of the copolymer, and is the most important characteristic of the characteristics (A) to (E) combined in the present invention. The characteristic (E) is that in the rubbery copolymer of the present invention the iodine number index $\alpha_1$ of the lower molecular weight components and the iodine number index $\alpha_2$ of the higher molecular weight components are, respectively, within the range $-30 \leq \alpha_1 \leq 0$ and the range $0 < \alpha_2 \leq 30$, preferably $-20 \leq \alpha_1 \leq -0.5$ and $0.5 \leq \alpha_2 \leq 20$, more preferably $-10 \leq \alpha_1 \leq -1$ and $1 \leq \alpha_2 \leq 10$.

The lower molecular weight components, the higher molecular weight components, and the iodine number indices $\alpha_1$ and $\alpha_2$ are defined as follows:

(1) The copolymer rubber is fractionated by column fractionation into 12 to 20 fractions. The iodine number and intrinsic viscosities of the fractions obtained are measured. The conditions for the fractionation are described below.

(a) 10 to 15 Grams of the sample is coated on 800 to 1000 ml of 100- to 200-mesh glass beads.

(b) A toluene/acetone (80/20 Vol%) mixed solvent is used as an eluting solvent. With the temperature raised stepwise from 0° C. to 55° C., the elution was performed to take 2 liters to 3 liters of the eluate as a single fraction. When it is necessary to elute the sample at a temperature of above 55° C., toluene is used as an eluting solvent.

(c) The elution product is concentrated to a suitable amount, and then precipitated in methanol. The precipitate is dried in vacuum, and the dried matter is measured for weight.

(2) The molecular weight of the fractions are plotted against their weights to draw a cumulative curve. The area defined by the curve, the ordinate axis, and the abscissa axis is divided into three parts—the part corresponding to 20 wt% of the total weight of the fractions and belonging to the lower molecular weight side, the part corresponding to 20 wt% of the total weight of the fractions and belonging to the higher molecular weight side, and the part corresponding to the remaining 60 wt% of said weight. The components on the lower molecular weight side are designated as L, and the components on the higher molecular weight side, as H, and the iodine number and molecular weights of L and H are measured.

(3) The iodine number of L is designated as $I_L$, the iodine number of H as $I_H$, and the average iodine value of the entire sample, as $\bar{I}$. Then, $\alpha_1$ is defined as $\alpha_1 = I_L - \bar{I}$, and $\alpha_2$ is defined as $\alpha_2 = I_H - \bar{I}$. When the molecular weight of L is designated as $M_L$, the molecular weight of H as $M_H$, and the average molecular weight of the entire sample, as $\bar{M}$, the relationship $M_L < \bar{M} < M_H$ is satisfied.

Many of the hitherto proposed ethylene/$\alpha$-olefin/polyene copolymer rubbers having wide molecular weight distributions have $\alpha_1$ of at least 1 and $\alpha_2$ of $-1.0$ or less. Even such copolymer rubbers having narrow molecular weight distributions have $\alpha_1$ of greater than 0 and $\alpha_2$ of less than 0. Thus, said conventional copolymer rubbers all have $\alpha_1$ that is greater than $\alpha_2$. Such copolymer rubbers do not possess superior processability, nor do they afford vulcanizates having superior physical properties.

The rubbery copolymer of this invention is required to have a combination of the characteristics (A) to (E). As a result of these characteristics affecting one another, the rubbery copolymer of this invention has satisfactory properties desired in rubber in a well-balanced combination.

The rubbery copolymer of the present invention can be obtained by copolymerizing ethylene, a $C_3$-$C_{10}$ $\alpha$-olefin and a polyene at a temperature of from about 40° C. to about 100° C. in the presence of a catalyst composed of (a) a vanadium compound expressed by the formula

wherein R represents a hydrocarbon group, X represents a halogen atom, and n is a positive number within the range of $0 < n \leq 3$, and (b) an organoaluminum compound of the formula

wherein R' represents a hydrocarbon group, X' represents a halogen atom, and m is a positive number within the range of $1 < m \leq 1.25$, the Al/V mole ratio in the catalyst being 2 to less than 5.

In the formula representing the vanadium compound (a), examples of R include aliphatic hydrocarbon groups such as methyl, ethyl, propyl, butyl, heptyl, hexyl and octyl; alicyclic hydrocarbon groups such as cyclohexyl; and aromatic hydrocarbon groups such as phenyl or benzyl. Of these, the aliphatic hydrocarbon groups are preferred, and alkyl groups having 1 to 20 carbon atoms, preferably 1 to 3 carbon atoms, especially $C_2H_5$, is suitable. Preferred halogen atoms for X are chlorine and bromine. Preferably, n is a positive number within the range of $1 \leq n \leq 2$.

When instead of the vanadium compounds (a), vanadium oxyhalides ($VOX_3$) or vanadium tetrahalides ($VX_4$) are used, the improvements by the present invention cannot be achieved.

Specific examples of the vanadium compounds (a) include $VO(OCH_3)Cl_2$, $VO(OCH_3)_2Cl$, $VO(OCH_3)_3$, $VO(OC_2H_5)Cl_2$, $VO(OC_2H_5)_{1.5}Cl_{1.5}$, $VO(OC_2H_5)_2Cl$, $VO(OC_2H_5)_3$, $VO(OC_2H_5)_{1.5}Br_{1.5}$, $VO(OC_3H_7)Cl_2$, $VO(OC_3H_7)_{1.5}Cl_{1.5}$, $VO(OC_3H_7)_2Cl$, $VO(OC_3H_7)_3$, $VO(O\ n\text{-}C_4H_9)Cl_2$, $VO(O\ n\text{-}C_4H_9)_2Cl$, $VO(O\ iso\text{-}C_4H_9)_2Cl$, $VO(O\ sec\text{-}C_4H_9)_3$, $VO(OC_5H_{11})_{1.5}Cl_{1.5}$, and mixtures of these. These compounds can be easily obtained, for example, by reacting $VOCl_3$ with alcohols or by reacting $VOCl_3$ with $VO(OR)_3$.

Selection of the type and amount used of the organoaluminum compound (b) is important to this invention. In the formula for the organoaluminum compound (b), m should be within the range of $1 < m \leq 1.25$, preferably $1 < m \leq 1.2$, more preferably $1.05 \leq m \leq 1.2$. The use of the organoaluminum compound (b) having $m \leq 1$ tends to generate a gel during the copolymerization, and also involves the disadvantage that the physical properties of a vulcanizate of the resulting copolymer are poor. The use of the compound (b) having m greater than 1.25 cannot afford a rubbery copolymer having a wide molecular weight distribution (high Q value).

Examples of R' and X' in the formula representing the organoaluminum compound (b) include an alkyl group, an alkenyl group, a cycloalkyl group, and an aryl group, preferably an alkyl group having 1 to 6 carbon atoms, for R'; and fluorine, chlorine, bromine and iodine, preferably chlorine, for X'.

The organoaluminum compound (b) used in this invention can be prepared, for example, by mixing $R'AlX'_2$ and $R'_{1.5}AlX'_{1.5}$ and/or $R'_2AlX'$ such that the average composition of the mixture will be the one expressed by the above formula. Of course, R's and X's may be the same or different. Specific examples are a mixture in an arbitrary ratio of $C_2H_5AlCl_2$ and $(C_2H_5)_{1.5}AlCl_{1.5}$, a mixture in an arbitrary ratio of iso-$C_4H_9AlCl_2$ and (iso-$C_4H_9)_{1.5}AlCl_{1.5}$, and a mixture in an arbitrary ratio of $C_2H_5AlCl_2$ and (iso-$C_4H_9)_{1.5}AlCl_{1.5}$.

The ratio between the organoaluminum compound (b) and the vanadium compound (a) is also important in this invention. Thus, the Al/V mole ratio should be 2 to less than 5. When the Al/V mole ratio is lower than the specified limit, a gel tends to form during copolymerization, and the ill distribution of the polyene component occurs in the resulting rubbery copolymer. When this ratio is too high, the activity of the catalyst is low and a rubbery copolymer having a wide molecular weight distribution (high Q value) is hard to obtain.

Excellent results can be obtained in the present invention when the copolymerization is carried out at a temperature of about 40° to about 100° C., preferably about 50° to about 80° C. The polymerization pressure is preferably from atmospheric pressure to about 50 kg/cm² (gauge pressure), more preferably from atmospheric pressure to about 20 kg/cm²·G.

In the process of this invention, the copolymerization is carried out, preferably, in an inert hydrocarbon or halogenated hydrocarbon medium. Examples of the inert medium are aliphatic hydrocarbons such as propane, butane, pentane, hexane, heptane, octane or kerosene; alicyclic hydrocarbons such as cyclohexane, and aromatic hydrocarbons such as benzene, toluene or xylene; and halogenated hydrocarbons such as ethyl chloride or chlorobenzene. These hydrocarbons can be used either alone or in combination. Or $C_3$-$C_{10}$ α-olefin may be used in excess to make them serve also as the reaction medium.

Preferably, the copolymerization is carried out such that the concentration of the vanadium compound (a) is from 0.01 to 5 millimoles/liter of the solvent, preferably from 0.1 to 2 millimoles/liter of the solvent. The amount of the organoaluminum compound (b) is adjusted such that the Al/V mole ratio becomes 2 to less than 5.

The copolymerization can be carried out either batchwise or continuously, but preferably, it is performed continuously. The average residence time in the polymerization vessel is preferably from about 5 to about 300 minutes, preferably from about 10 minutes to about 250 minutes. The copolymerization is carried out preferably under such conditions that the rubbery copolymer dissolves in the reaction medium. A molecular weight controlling agent such as hydrogen may be added when it is desired to control the molecular weight of the rubbery copolymer. The ethylene content and molecular weight of the rubbery copolymer can be controlled by varying the ratio between ethylene and $C_3$-$C_{10}$ α-olefin and the concentration of hydrogen used for molecular weight control.

The rubbery ethylene/$C_3$-$C_{10}$ α-olefin/polyene copolymer of this invention is sulfur-curable, and can be cured in the same way as other synthetic rubbery copolymers or natural rubber.

Suitable vulcanizing agents for rubber compounding recipes include peroxides, sulfur, sulfur compounds such as sulfur monochloride, sulfur dichloride, morpholine disulfide, alkyl phenol disulfides, tetramethylthiuram disulfide, and selenium dimethyldithiocarbamate, and metallic compounds such as magnesium oxide, zinc oxide and red lead. When vulcanization is carried out using sulfur, its amount is adjusted to about 0.1 to about 10 parts by weight, preferably from about 0.5 to about 5 parts by weight, per 100 parts by weight of the rubbery component.

As required, a vulcanization accelerator may be used in vulcanization. Examples of the vulcanization accelerators include thiazole compounds such as N-cyclohexyl-2-benzothiazole sulfenamide, N-oxydiethylene-2-benzothiazolesulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole and benzothiazyldisulfide; guanidine compounds such as diphenyl guanidine, triphenyl guanidine, di-ortho-tolyl guanidine, ortho-tolyl biguanide and diphenyl guanidine phthalate; aldehyde-amine compounds such as the reaction product of acetoaldehyde or butylaldehyde and aniline; aldehyde-ammonia compounds such as hexamethylene tetramine and acetaldehyde-ammonia; imidazoline compounds such as 2-mercaptoimidazoline; thiourea compounds such as thiocarbanilide, diethylthiourea, dibutylthiourea, trimethylthiourea and di-ortho-tolyl thiourea; thiuram compounds such as tetramethylthiuram monosulfide, tetramethylthiuram disulfide, tetraethylthiuram disulfide, tetrabutylthiuram disulfide and dipentamethylenethiuram tetrasulfide; dithiocarbamate compounds such as zinc dimethyldithiocarbamate, zinc diethylthiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium diethyldithiocarbamate; and xanthates such as zinc dibutylxanthogenate. The vulcanization accelerator is used, preferably, in an amount of about 0.1 to about 20 parts by weight, more preferably about 0.2 to about 10 parts by weight, per 100 parts by weight of the rubbery component.

The rubbery ethylene/$C_3$–$C_{10}$ α-olefin/polyene copolymer of this invention can also be vulcanized with peroxide vulcanization systems. Suitable peroxides that can be used for this purpose are dicumyl peroxide, 1,1'-di-(t-butyl-peroxy)-3,3,5-trimethylcyclohexane, di-(t-butylperoxy)diisopropylbenzene, 2,5-dimethyl-2,5-di-(t-butylperoxy)hexane and 2,5-dimethyl-2,5-di-(t-butylperoxy)hexene. In this vulcanization system, sulfur, sulfur compounds such as dipentamethylenethiuram tetrasulfide, polyfunctional monomers such as ethylene dimethacrylate, divinylbenzene, diallyl phthalate, metaphenylene bismaleimide and tolylene bismaleimide, and oxime compounds such as p-quinonedioxime and p,p'-dibenzoylquinoneoxime, etc. can be used as vulcanization aids either alone or as mixtures.

If desired, other additives may be used in compounding the rubbery copolymer of this invention. These other additives include activators, dispersing agents, fillers, softening agents, plasticizers, tackifiers, coloring agents, blowing agents, blowing promotors, lubricants, and antioxidants.

Specific examples of the activators are diethyllene glycol and polyethylene oxide.

Examples of the dispersing agents are stearic acid, lauric acid, oleic acid and zinc stearate.

Examples of the fillers are inorganic fillers such as carbon black, white carbon (silicate compound), calcium carbonate, talc and clay, and organic fillers such as high styrene resins, coumarone-indene resin, phenolic resins, lignin, modified melamine resins and petroleum resins. The inorganic fillers are preferred.

Examples of the softening agents are petroleum-type softening agents such as process oil, lubricant, paraffin, liquid paraffin, petroleum asphalt and vaseline; coal tar-type softening agents such as coal tar and coal tar pitch; fat oils such as castor oil, linseed oil, colza oil and coconut oil; tall oil; waxes such as beeswax, carnauba wax and lanolin; fatty acids and the salts thereof such as ricinoleic acid, palmitic acid, barium stearate, calcium stearate and zinc laurate; and synthetic polymeric materials such as petroleum resins.

Examples of the plasticizers are phthalate compounds, adipate compounds, sebacate compounds, and phosphoric acid compounds.

Examples of the tackifiers are coumarone-indene resin, terpene-phenol resin and xylene-formaldehyde resin.

Examples of the coloring agents are inorganic and organic pigments.

Examples of the blowing agents are sodium bicarbonate, ammonium carbonate, N,N'-dinitrosopentamethylene tetramine, azocarbonamide, azobisisobutyronitrile, benzenesulfonyl hydrazide, toluenesulfonyl hydrazide, calcium azide and p-toluenesulfonyl azide. Examples of the blowing promotors are salicylic acid, phthalic acid and urea.

Examples of the lubricants are paraffin wax, stearic acid, stearamide, n-butyl stearate, ketone wax and stearyl alcohol.

Examples of the antioxidants are phenyl-β-naphthylamine, aldol-α-naphthylamide, di-β-naphthyl-p-phenylene diamine, styrenated phenol, 2-mercaptobenzimidazole, and nickel dibutyl dithiocarbamate.

The amounts of these additives can be selected as required, and are, for example, up to about 10% by weight for the activators, up to about 10% by weight for the dispersing agents, up to about 300% by weight for the fillers, up to about 150 parts by weight for the softening agents, up to about 10% by weight for the plasticizers, up to about 20% by weight for the tackifiers, up to about 15% by weight for the coloring agents, up to about 25% by weight for the blowing agents, up to about 10% by weight for the blowing aids, up to about 5% by weight for the lubricants, and up to about 3% by weight for the antioxidants, all based on the weight of the rubbery copolymer.

In vulcanizing the rubbery ethylene/$C_3$–$C_{10}$ α-olefin/polyene copolymer of this invention, the vulcanization conditions can be selected depending upon the type of the vulcanizing agent. Usually, the vulcanization is carried out at a temperature of about 100° to about 250° C., preferably about 120° to about 200° C., for a period of about 10 minutes to about 60 minutes, preferably about 20 minutes to about 40 minutes. When vulcanization is carried out with peroxide systems, the vulcanization time should preferably be adjusted to about four times as long as the half-life period of the peroxide used.

The present invention will be described in greater detail with reference to the following Examples and Comparative Examples.

EXAMPLE 1

Terpolymerization of ethylene, propylene and dicyclopentadiene was performed continuously by using a 15-liter stainless steel polymerization vessel equipped with agitating blades. Specifically, hexane was continuously fed at a rate of 5 liters per hour as a polymerization solvent from the top of the polymerization vessel, while a polymer solution was continuously taken out from the bottom of the polymerization vessel such that the polymer solution in the polymerization vessel was always 5 liters in volume.

Polymerization catalyts were (A) the reaction product of vanadium oxytrichloride with ethyl alcohol (prepared in a catalyst preparation vessel such that the vanadium oxytrichloride/ethyl alcohol mole ratio became 1/1) and (B) a mixture of ethyl aluminum sesquichloride [$(C_2H_5)_{1.5}AlCl_{1.5}$] and ethyl aluminum dichloride [$(C_2H_5)$-$AlCl_2$] (prepared such that the ethyl aluminum sesquichloride/ethyl aluminum dichloride mole ratio became 3/7). These catalysts (A) and (B) were fed continuously into the polymerization vessel from its top, respectively, such that the vanadium atom concentration in the polymerization vessel was 0.6 millimole/liter and such that the aluminum atom concentration in the polymerization vessel was 2.4 millimoles/liter. Also, a mixed gas of ethylene and propylene (ethylene 36 mole%, propylene 64 mole%) was fed from the top of the polymerization vessel at a rate of 610 liters per hour. Hydrogen gas as a molecular weight regulator was fed at a rate of 1.0 liter per hour. Dicyclopentadiene was fed continuously from the top of the polymerization vessel at a rate of 25 g per hour.

The copolymerization reaction was carried out at 60° C. by circulating warm water through a jacket attached to the outside of the polymerization vessel. The pressure of the polymerization vessel was 8 kg/cm² (gauge pressure).

The copolymerization reaction performed under the above-mentioned conditions gave an ethylene/propylene/dicyclopentadiene copolymer as a homogeneous solution. A small amount of methanol was added to the polymer solution taken out from the bottom of the polymerization vessel to stop the polymerization reaction. The polymer was recovered by steam stripping, and then dried for a day at 80° C. under reduced pressure.

The above-described procedure afforded an ethylene/propylene/dicyclopentadiene copolymer at a rate of 300 g per hour.

Infrared spectrum analysis showed that the copolymer had an ethylene content of 72.2 mole%, an intrinsic viscosity $[\eta]$, measured in decalin at 135° C., of 2.25 dl/g, and an iodine number of 9.5.

100 Parts by weight of the resulting copolymer, 5 parts by weight of zinc oxide, 1.5 parts by weight of stearic acid, 65 parts by weight of carbon black (SEAST H, a product of Tokai Carbon Co., Ltd.), 30 parts by weight of a naphthenic oil (SUNTHENE 4240, a product of Nippon Sunoil Co., Ltd.), 0.5 part by weight of 2-mercaptobenzothiazole, 1.5 parts by weight of tetramethylthiuram monosulfide, and 1.5 parts by weight of sulfur were milled on 8-inch open rolls for 30 minutes at a roll temperature of 50° C. to prepare a compound. This compound was observed for feedability to the rolls and clingability to the rolls, during the milling whereby its roll processability was evaluated on a scale of five grades:

(5) The rubber band clung completely to the roll and the bank rotated smoothly.

(4) The band sometimes left the roll surface between the top of the roll and the bank.

(3) The band left the roll surface between the top of the roll and the bank.

(2) The band did not cling to the surface of the roll, and roll processing was impossible without manual help.

(1) The band did not cling at all to the surface of the roll, and sagged from it, and could not be processed on the rolls without manual help.

The roll processability in this Example was 5.

Further, the extrudability of the compound was observed at 80° C. by a capillary flow tester, and the extrudate was evaluated on a scale of five grades as a measure of the processability:

(5) The extrudate had no irregularities on the surface and had good gloss.

(4) The extrudate had virtually no irregularities on the surface and had no gloss.

(3) The extrudate had a few irregularities on the surface and had no gloss.

(2) The extrudate had irregularities on the surface and had no gloss.

(1) The extrudate had large irregularities on the surface and had no gloss at all.

The extrudability in this Example was 5.

Upon characterization, the resulting polymer was found to have iodine number indices $\alpha_1$ and $\alpha_2$ of $-2.5$ and $+3.5$, respectively, and a molecular weight distribution value (Q value), measured by GPC, of 6.2.

Then, the resulting compound was press vulcanized for 30 minutes at 160° C., and the vulcanizate was subjected to a tensile test in accordance with JIS K 6301. The physical properties of the vulcanizate were as follows: 300% modulus, 150 kg/cm²; tensile strength, 250 kg/cm²; and elongation, 440%.

EXAMPLES 2 TO 15 AND COMPARATIVE EXAMPLES 1 TO 13

The procedure of Example 1 was repeated except that the polymerization conditions shown in Table 1 were employed. Each of the resulting copolymers was made into a compound in the same way as in Example 1, and its processability was evaluated. Further the compound was vulcanized in the same way as in Example 1, and the physical properties of the vulcanizate were measured. The results are shown in Table 2.

TABLE 1

(Examples 1 to 15)

| Ex. | V compound | V concentration (mM/l) | Al compound | Al/V (mole ratio) | Polymerization temperature (°C.) | Yield of copolymer (g/hr) |
|---|---|---|---|---|---|---|
| 1 | Reaction product of VOCl₃ with C₂H₅OH (1/1) | 0.6 | $(C_2H_5)_{1.5}AlCl_{1.5}$/$C_2H_5AlCl_2$ (3/7) | 4 | 60 | 300 |
| 2 | Reaction product of VOCl₃ with C₂H₅OH (1/1.5) | " | $(C_2H_5)_{1.5}AlCl_{1.5}$/$C_2H_5AlCl_2$ (3/7) | " | " | 300 |
| 3 | Reaction product of VOCl₃ with n-C₃H₇OH (1/1) | " | $(C_2H_5)_{1.5}AlCl_{1.5}$/$C_2H_5AlCl_2$ (3/7) | " | " | 290 |
| 4 | Reaction product of VOCl₃ with n-C₁₀H₂₁OH (1/1) | " | $(C_2H_5)_{1.5}AlCl_{1.5}$/$C_2H_5AlCl_2$ (3/7) | " | " | 290 |
| 5 | Reaction product of VOCl₃ with oleyl alcohol (1/1) | " | $(C_2H_5)_{1.5}AlCl_{1.5}$/$C_2H_5AlCl_2$ (3/7) | " | " | 280 |
| 6 | Reaction product of VOCl₃ with VO(OC₂H₅)₃ (2/1) | " | $(C_2H_5)_{1.5}AlCl_{1.5}$/$C_2H_5AlCl_2$ (3/7) | " | " | 280 |
| 7 | Reaction product of VOCl₃ with VO(OC₂H₅)₃ (1/1) | " | $(C_2H_5)_{1.5}AlCl_{1.5}$/$C_2H_5AlCl_2$ (3/7) | " | " | 280 |
| 8 | VO(OC₂H₅)₃ | 0.7 | $(C_2H_5)_{1.5}AlCl_{1.5}$/$C_2H_5AlCl_2$ (3/7) | 4 | 60 | 270 |
| 9* | Reaction product of VOCl₃ with C₂H₅OH (1/1) | 1.0 | $(C_2H_5)_{1.5}AlCl_{1.5}$/$C_2H_5AlCl_2$ (3/7) | " | 80 | 280 |
| 10 | Reaction product of VOCl₃ with C₂H₅OH (1/1) | 0.6 | $(C_2H_5)_{1.5}AlCl_{1.5}$/$C_2H_5AlCl_2$ (1/1) | " | 60 | 290 |
| 11 | Reaction product of VOCl₃ with C₂H₅OH (1/1) | " | $(C_2H_5)_{1.5}AlCl_{1.5}$/$C_2H_5AlCl_2$ (1/9) | " | " | 260 |
| 12 | Reaction product of VOCl₃ | 0.7 | $(C_2H_5)_{1.5}AlCl_{1.5}$/ | 3 | " | 270 |

TABLE 1-continued

| | | | | | | |
|---|---|---|---|---|---|---|
| | with C$_2$H$_5$OH (1/1) | | C$_2$H$_5$AlCl$_2$ (3/7) | | | |
| 13** | Reaction product of VOCl$_3$ with C$_2$H$_5$OH (1/1) | 0.8 | (C$_2$H$_5$)$_{1.5}$AlCl$_{1.5}$/ C$_2$H$_5$AlCl$_2$ (3/7) | 2 | " | 280 |
| 14 | Reaction product of VOCl$_3$ with C$_2$H$_5$OH (1/1) | 0.6 | (iso-C$_4$H$_9$)$_{1.5}$AlCl$_{1.5}$/ C$_2$H$_5$AlCl$_2$ (3/7) | 4 | " | 280 |
| 15*** | Reaction product of VOCl$_3$ with C$_2$H$_5$OH (1/1) | 0.4 | (C$_2$H$_5$)$_{1.5}$AlCl$_{1.5}$/ C$_2$H$_5$AlCl$_2$ (3/7) | 4 | " | 300 |

*Ethylene/propylene mixed gas (ethylene 41 mole %, propylene 59 mol %), hydrogen 0.6 liter/hr
**Ethylene/propylene mixed gas (ethylene 38 mole %, propylene 62 mole %), hydrogen 0.6 liter/hr
***Ethylene/propylene mixed gas (ethylene 42 mole %, propylene 58 mole %), hydrogen 1.3 liters/hr (Comparative Examples 1 to 13)

| Comp. Ex. | V Compound | V concentration (mM/l) | Al Compound | Al/V (mole ratio) | Polymerization temperature (°C.) | Yield of copolymer (g/hr) | Remarks |
|---|---|---|---|---|---|---|---|
| 1 | VOCl$_3$ | 1 | (C$_2$H$_5$)$_{1.5}$AlCl$_{1.5}$ | 4 | 60 | 150 | Gel formed |
| 2 | " | " | " | 15 | " | 160 | Gel formed |
| 3 | " | " | (C$_2$H$_5$)$_{1.5}$AlCl$_{1.5}$/C$_2$H$_5$AlCl$_2$(3/7) | 4 | " | 160 | Gel formed |
| 4 | " | " | " | 15 | " | 180 | |
| 5 | " | " | (C$_2$H$_5$)$_{1.5}$AlCl$_{1.5}$/C$_2$H$_5$AWlCl$_2$ (7/3) | 4 | " | 190 | |
| 6 | " | " | " | 15 | " | 170 | |
| 7 | Reaction product of VOCl$_3$ with C$_2$H$_5$OH (1/1) | 0.7 | (C$_2$H$_5$)$_{1.5}$AlCl$_{1.5}$ | 4 | " | 280 | Gel formed |
| 8 | Reaction product of VOCl$_3$ with C$_2$H$_5$OH (1/1) | " | " | 15 | " | 260 | |
| 9 | Reaction product of VOCl$_3$ with C$_2$H$_5$OH (1/1) | " | (C$_2$H$_5$)$_{1.5}$AlCl$_{1.5}$/C$_2$H$_5$AlCl$_2$ (7/3) | 4 | " | 280 | |
| 10 | Reaction product of VOCl$_3$ with C$_2$H$_5$OH (1/1) | " | " | 15 | " | 270 | |
| 11 | Reaction product of VOCl$_3$ with C$_2$H$_5$OH (1/1) | " | (C$_2$H$_5$)$_{1.5}$AlCl$_{1.5}$/C$_2$H$_5$AlCl$_2$ (3/7) | " | " | 260 | |
| 12 | Reaction product of VOCl$_3$ with C$_2$H$_5$OH (1/1) | 0.4 | " | 4 | 35 | 280 | |
| 13 | Reaction product of VOCl$_3$ with C$_2$H$_5$OH (/1/) | 0.3 | (C$_2$H$_5$)$_{1.5}$AlCl$_{1.5}$ | 15 | " | 270 | |

Comp. Exs. 1 - 6: Ethylene/propylene mixed gas (ethylene 32 mole %, propylene 68 mole %), hydrogen 1.3 liters/hr, dicyclopentadiene 18 g/hr
Comp. Exs. 7 - 11: Same as in Example 1
Comp. Ex. 12: Ethylene/propylene mixed gas (ethylene 41 mole %, propylene 59 mole %), hydrogen 2.3 liters/hr
Comp. Ex. 13: Ethylene/propylene mixed gas (ethylene 43 mole %, propylene 57 mole %), hydrogen 2.5 liters/hr

TABLE 2

| | Properties of copolymer | | | | | | Processability of copolymer | | Physical properties of vulcanized copolymer | | |
|---|---|---|---|---|---|---|---|---|---|---|---|
| Ex. | Ethylene content (mole %) | Intrinsic viscosity ($\eta$) | Iodine number | $\alpha_1$ | $\alpha_2$ | Q | Roll processability | Extrudability | 300% Modulus (M300) kg/cm$^2$ | Tensile strength (TB) kg/cm$^2$ | Tensile elongation (EB) % |
| 1 | 72.2 | 2.25 | 9.5 | −2.5 | +3.5 | 6.2 | 5 | 5 | 150 | 245 | 440 |
| 2 | 70.3 | 2.16 | 8.7 | −3.0 | +3.3 | 5.9 | 5 | 5 | 145 | 245 | 430 |
| 3 | 71.1 | 2.21 | 9.0 | −4.0 | +3.2 | 5.8 | 5 | 5 | 146 | 247 | 430 |
| 4 | 71.8 | 2.13 | 9.1 | −2.0 | +2.5 | 5.8 | 5 | 5 | 150 | 250 | 440 |
| 5 | 71.0 | 2.25 | 9.2 | −1.9 | +2.4 | 5.7 | 5 | 5 | 147 | 246 | 440 |
| 6 | 71.3 | 2.26 | 9.2 | −2.8 | +3.0 | 6.1 | 5 | 5 | 150 | 250 | 440 |
| 7 | 70.5 | 2.21 | 9.3 | −1.0 | +1.8 | 6.0 | 5 | 5 | 145 | 245 | 430 |
| 8 | 71.0 | 2.23 | 9.6 | −2.5 | +2.0 | 4.5 | 5 | 4 | 145 | 243 | 440 |
| 9 | 70.8 | 2.12 | 9.2 | −4.0 | +3.4 | 6.9 | 5 | 5 | 142 | 241 | 440 |
| 10 | 71.2 | 2.15 | 9.0 | −3.8 | +2.0 | 5.3 | 5 | 5 | 151 | 253 | 430 |
| 11 | 72.0 | 2.25 | 9.7 | −2.7 | +3.9 | 10 | 5 | 5 | 143 | 240 | 440 |
| 12 | 71.8 | 2.18 | 9.5 | −1.9 | +2.1 | 7.3 | 5 | 5 | 141 | 242 | 440 |
| 13 | 72.2 | 2.25 | 9.2 | −2.1 | +2.2 | 12 | 5 | 5 | 140 | 240 | 420 |
| 14 | 71.7 | 2.19 | 9.3 | −1.5 | +2.1 | 6.0 | 5 | 5 | 145 | 246 | 430 |

TABLE 2-continued

| Comp. Ex. | Properties of copolymer | | | | | | Processability of copolymer | | Physical properties of vulcanized copolymer | | |
|---|---|---|---|---|---|---|---|---|---|---|---|
| | Ethylene content (mole %) | Intrinsic viscosity ($\eta$) | Iodine number | $\alpha_1$ | $\alpha_2$ | Q | Roll processability | Extrudability | 300% modulus (M300) kg/cm$^2$ | Tensile strength (TB) kg/cm$^2$ | Tensile elongation (FB) % |
| 15 | 75.5 | 2.43 | 8.8 | −1.1 | +2.3 | 6.1 | 5 | 5 | 150 | 270 | 440 |
| 1 | 70.5 | 2.13 | 9.6 | +1.8 | −1.0 | 3.8 | 4 | 4 | 87 | 140 | 610 |
| 2 | 71.2 | 2.21 | 9.0 | +2.5 | −1.5 | 3.5 | 5 | 4 | 95 | 147 | 580 |
| 3 | 70.7 | 2.10 | 9.2 | +2.0 | −1.8 | 3.2 | 5 | 4 | 92 | 145 | 600 |
| 4 | 69.6 | 2.16 | 9.1 | +3.0 | −2.0 | 3.0 | 3 | 3 | 102 | 152 | 560 |
| 5 | 71.9 | 2.25 | 8.8 | +1.0 | −2.1 | 3.8 | 4 | 4 | 97 | 149 | 570 |
| 6 | 70.4 | 2.20 | 9.3 | +2.5 | −1.9 | 2.9 | 3 | 3 | 118 | 180 | 500 |
| 7 | 71.8 | 2.32 | 8.9 | +1.8 | −1.5 | 3.5 | 4 | 4 | 110 | 170 | 520 |
| 8 | 70.3 | 2.19 | 9.6 | +2.7 | −1.6 | 3.0 | 3 | 3 | 121 | 195 | 490 |
| 9 | 71.8 | 2.13 | 9.1 | +1.1 | −1.1 | 2.7 | 3 | 3 | 120 | 191 | 490 |
| 10 | 70.0 | 2.25 | 9.9 | +1.2 | −1.3 | 2.6 | 2 | 3 | 145 | 240 | 450 |
| 11 | 70.1 | 2.35 | 9.5 | +0.9 | −0.9 | 3.0 | 2 | 3 | 140 | 230 | 460 |
| 12 | 69.8 | 2.16 | 9.2 | +0.8 | −0.9 | 3.7 | 3 | 4 | 141 | 230 | 490 |
| 13 | 72.3 | 2.13 | 9.8 | +0.8 | −1.1 | 2.5 | 2 | 2 | 145 | 245 | 430 |

(EB)

EXAMPLE 16

The procedure of Example 1 was repeated except that 5-ethylidene-2-norbornene was fed at a rate of 28 g per hour instead of the dicyclopentadiene fed, that an ethylene/propylene mixed gas (ethylene 45 mole%, propylene 55 mole%) was fed at a rate of 550 liters per hour from the top of the polymerization vessel, and that hydrogen gas was fed at a rate of 2.0 liters per hour. As a result, a copolymer was obtained at a rate of 340 g per hour. The copolymer had an ethylene content of 76.1 mole%, an intrinsic viscosity $[\eta]$ of 1.59 dl/g, and an iodine number of 14.2.

The same characterization as in Example 1 showed that the copolymer had iodine number indices $\alpha_1$ and $\alpha_2$ of −2.3 and +3.6, respectively, and a molecular weight distribution value (Q value) in accordance with GPC of 6.4.

The resulting copolymer was formulated into a compound in the same manner as in Example 1. The roll processability and the extrudability of the compound were evaluated in the same way as in Example 1, and they were found to be both in the grade 5. Further, the compound was press vulcanized at 160° C. for 30 minutes, and the vulcanizate was subjected to a tensile test in accordance with JIS K 6301. The test showed the vulcanizate to have a 300% modulus of 152 kg/cm$^2$, a tensile strength of 248 kg/cm$^2$, and an elongation of 460%.

EXAMPLE 17

The procedure of Example 1 was repeated except that 5-ethylidene-2-norbornene was fed at a rate of 28 g per hour instead of the dicyclopentadiene, that the vanadium atom concentration in the polymerization vessel was 0.4 millimole/liter and the aluminum atom concentration in the polymerization vessel was 1.6 millimoles/liter, an ethylene/propylene mixed gas (ethylene 51 mole%, propylene 49 mole%) was fed at a rate of 490 liters per hour from the top of the polymerization vessel, and that hydrogen gas was fed at a rate of 3.8 liters per hour. Thereby was obtained a copolymer at a rate of 300 g per hour.

The copolymer had an ethylene content of 81.6 mole%, an intrinsic viscosity $[\eta]$ of 1.44 L dl/g, an iodine value of 16.8, an $\alpha_1$ of −2.1, an $\alpha_2$ of +3.2 and a Q value of 5.8.

The resulting copolymer was formulated into a compound in the same way as in Example 1. The roll processability and extrudability of the compound were evaluated in the same way as in Example 1, and were both found to be in the grade 5. The compound was further press vulcanized for 30 minutes at 160° C., and the vulcanizate was subjected to a tensile test by JIS K 6301. The vulcanizate had a 300% modulus of 163 kg/cm$^2$, a tensile strength of 265 kg/cm$^2$ and an elongation of 430%.

EXAMPLE 18

The procedure of Example 1 was repeated except that dicyclopentadiene was fed at a rate of 31 g per hour, that an ethylene/1-butene mixed gas (ethylene 53 mole%, 1-butene 47 mole%) was fed at a rate of 650 liters per hour from the top of the polymerization vessel, and that hydrogen gas was fed at a rate of 0.5 liter per hour. Thus was obtained a copolymer at a rate of 275 g per hour.

The copolymer had an ethylene content of 88.7 mole%, an intrinsic viscosity $[\eta]$ of 1.04 dl/g, and an iodine number of 9.3. $\alpha_1$ of the copolymer was −2.2 and its $\alpha_2$ was +3.0. The Q value was 5.9.

The resulting copolymer was formulated into a compound in the same way as in Example 1. The roll processability and extrudability of the compound were evaluated in the same way as in Example 1, and they were both found to be in the grade 5. The compound was then press vulcanized at 160° C. for 30 minutes, and the vulcanizate was subjected to a tensile test under JIS K 6301. The vulcanizate had a 300% modulus of 173 kg/cm$^2$, a tensile strength of 278 kg/cm$^2$ and an elongation of 430%.

EXAMPLE 19

The procedure of Example 1 was repeated except that 5-ethylidene-2-norbornene was fed at a rate of 40 g per hour instead of the dicyclopentadiene, that the vanadium atom concentration in the polymerization vessel was changed to 1.0 millimole/liter, and the aluminum atom concentration in the polymerization vessel was changed to 4.0 millimoles/liter, that an ethylene/propylene mixed gas (ethylene 30 mole%, propylene 70 mole%) was fed at a rate of 600 liters per hour from the top of the polymerization vessel, and that hydrogen gas was fed at a rate of 3.8 liters per hour. As a result, a copolymer was obtained at a rate of 280 g per hour.

The ethylene content of the copolymer was 64.8 mole%, the intrinsic viscosity [η] was 1.30 dl/g, and the iodine number was 22.8. The copolymer had an $\alpha_1$ of $-3.0$ and an $\alpha_2$ of $+3.5$. The Q value was 6.1.

The resulting copolymer was formulated into a compound in the same way as in Example 1. The roll processability and extrudability of the compound were evaluated in the same way as in Example 1, and were both found to be in the grade 5. The composition was press vulcanized at 160° C. for 30 minutes, and the vulcanizate was subjected to a tensile test under JIS K 6301. The 300% modulus of the vulcanizate was 120 kg/cm², the tensile strength, 235 kg/cm², and the elongation, 460%.

EXAMPLE 20

The procedure of Example 1 was repeated except that hydrogen gas was fed at a rate of 0.8 liter per hour. Thus was obtained a copolymer at a rate of 280 g per hour.

The copolymer had an ethylene content of 71.5 mole%, an intrinsic viscosity [η] of 3.14 dl/g, and an iodine number of 9.7. The $\alpha_1$ of the copolymer was $-2.0$ and the $\alpha_2$, $+2.5$. The Q value was 6.8.

The copolymer was formulated into a compound in the same way as in Example 1. The same evaluations as in Example 1 showed that the roll processability and extrudability of the compound were both in the grade 5. Said compound was press vulcanized at 160° C. for 30 minutes, and the resulting vulcanizate was subjected to a tensile test under JIS K6301. The vulcanizate had a 300% modulus of 150 kg/cm², a tensile strength of 263 kg/cm², and an elongation of 430%.

What is claimed is:

1. A rubbery copolymer of ethylene, an α-olefin having 3 to 10 carbon atoms and a non-conjugated diene, characterized by having
   (A) an ethylene/α-olefin mole ratio of from 50/50 to 95/5,
   (B) an iodine value of from 5 to 50,
   (C) an intrinsic viscosity [η], measured in decalin at 135° C., of from 1.0 to 6.0 dl/g,
   (D) a weight average molecular weight/number average molecular weight ratio ($\overline{M}w/\overline{M}n$) of from 4 to 12, and
   (E) an iodine value index $\alpha_1$ for the lower molecular weight components and an iodine value index $\alpha_2$ for the higher molecular weight components, said $\alpha_1$ and $\alpha_2$ falling within the ranges $-10 \leq \alpha_1 \leq -1$ and $1 \leq \alpha_2 \leq 10$.

2. A rubbery copolymer as recited in claim 1, wherein the α-olefin is propylene and the mole ratio in (A) is from 50/50 to 90/10.

3. A rubbery copolymer as recited in claim 1, wherein the α-olefin is 1-butene and the mole ratio in (A) is from 80/20 to 95/5.

4. A rubbery copolymer as recited in claim 1, wherein the non-conjugated diene is a cyclic non-conjugated diene.

5. A rubbery copolymer as recited in claim 4, wherein the cyclic non-conjugated diene is 5-ethylidene-2-norbornene or dicyclopentadiene.

6. A rubbery copolymer of ethylene, an α-olefin having 3 to 10 carbon atoms and a non-conjugated diene, characterized by having
   (A) an ethylene/α-olefin mole ratio of from 50/50 to 95/5,
   (B) an iodine value of from 5 to 50,
   (C) an intrinsic viscosity [η], measured in decalin at 135° C., of from 1.0 to 6.0 dl/g,
   (D) a weight average molecular weight/number average molecular weight ratio ($\overline{M}w/\overline{M}n$) of from 4 to 12, and
   (E) an iodine value index $\alpha_1$ for the lower molecular weight components and an iodine value index $\alpha_2$ for the higher molecular weight components, said $\alpha_1$ and $\alpha_2$ falling within the ranges $-10 \leq \alpha_1 \leq -1$ and $1 \leq \alpha_2 \leq 10$ said copolymer being obtained by copolymerizing ethylene, the α-olefin having 3 to 10 carbon atoms and the non-conjugated diene at a temperature of from about 40° C. to about 100° C. in the presence of a catalyst composed of
   (a) a vanadium compound of the formula

   $$VO(OR)_n X_{3-n}$$

wherein R represents a hydrocarbon group, X represents a halogen atom, and n is a positive number within the range of $0 < n \leq 3$, and
   (b) an organoaluminum compound of the formula

   $$R'_m AlX'_{3-m}$$

wherein R' represents a hydrocarbon group, X' represents a halogen atom, and m is a positive number within the range of $1 < m \leq 1.25$,
the Al/V mole ratio being 2 to less than 5.

* * * * *